(12) United States Patent
Carolan et al.

(10) Patent No.: US 9,145,680 B2
(45) Date of Patent: Sep. 29, 2015

(54) COMPOSITE INSULATION PANEL

(75) Inventors: James Carolan, Kingscourt (IE);
Gregory Flynn, Collon (IE)

(73) Assignee: Kingspan Research and Developments Limited, Kingscourt (IE)

( * ) Notice: Subject to any disclaimer, the term of this patent is extended or adjusted under 35 U.S.C. 154(b) by 0 days.

(21) Appl. No.: 13/984,301

(22) PCT Filed: Feb. 9, 2012

(86) PCT No.: PCT/IE2012/000004
§ 371 (c)(1),
(2), (4) Date: Oct. 21, 2013

(87) PCT Pub. No.: WO2012/107917
PCT Pub. Date: Aug. 16, 2012

(65) Prior Publication Data
US 2014/0053485 A1    Feb. 27, 2014

(30) Foreign Application Priority Data

Feb. 9, 2011    (IE) ..................................... 2011/0057

(51) Int. Cl.
| | | |
|---|---|---|
| *E04C 2/24* | (2006.01) | |
| *E04C 2/292* | (2006.01) | |
| *E04D 3/35* | (2006.01) | |
| *F16J 15/14* | (2006.01) | |
| *E04C 2/20* | (2006.01) | |

(52) U.S. Cl.
CPC ................. *E04C 2/243* (2013.01); *E04C 2/205* (2013.01); *E04C 2/292* (2013.01); *E04D 3/352* (2013.01); *E04D 3/358* (2013.01); *F16J 15/14* (2013.01)

(58) Field of Classification Search
CPC ......... E04D 3/352; E04D 3/358; E04D 3/357; E04C 2/292; E04C 2/205; E04C 2/243; F16J 15/14
USPC ................... 52/309.4, 309.5, 309.13, 309.14, 52/309.15, 783.1, 783.11, 794.1
See application file for complete search history.

(56) References Cited

U.S. PATENT DOCUMENTS

| | | | | |
|---|---|---|---|---|
| 3,290,845 A | * | 12/1966 | Snyder ............................. | 52/478 |
| 3,466,831 A | * | 9/1969 | Lenoir ............................. | 52/521 |
| 3,714,747 A | * | 2/1973 | Curran ......................... | 52/309.2 |
| 4,177,615 A | * | 12/1979 | Anderson ........................ | 52/478 |
| 4,184,301 A | * | 1/1980 | Anderson et al. ............... | 52/478 |
| 4,241,555 A | * | 12/1980 | Dickens et al. ................. | 52/454 |

(Continued)

FOREIGN PATENT DOCUMENTS

| | | |
|---|---|---|
| GB | 2345705 A | 7/2000 |
| GB | 2439189 A | 12/2007 |
| GB | 2460762 A | 12/2009 |

*Primary Examiner* — James Ference
(74) *Attorney, Agent, or Firm* — Harness, Dickey & Pierce, P.L.C.

(57) ABSTRACT

A manufactured composite insulating panel comprises an external sheet having an outer face and an inner face, an internal sheet having an outer face and an inner face, and an insulating body between the inner face of the external sheet and the inner face of the internal sheet. The external sheet has a portion that extends beyond the internal sheet and the insulating body to define an overlap part for overlapping with part of an adjacent panel, on assembly and a seal is applied to the inner face of the overlap part of the external sheet. The panel has a side overlap part to which a side seal is factory applied. An end seal is also factory applied to an end overlap part of the panel.

21 Claims, 5 Drawing Sheets

(56) References Cited

U.S. PATENT DOCUMENTS

| | | | |
|---|---|---|---|
| 4,575,981 A * | 3/1986 | Porter | 52/309.9 |
| 4,700,520 A * | 10/1987 | Ting | 52/478 |
| 4,936,069 A * | 6/1990 | Hunter et al. | 52/309.4 |
| 5,394,672 A * | 3/1995 | Seem | 52/794.1 |
| 5,502,939 A * | 4/1996 | Zadok et al. | 52/309.9 |
| 5,678,369 A * | 10/1997 | Ishikawa et al. | 52/309.9 |
| 6,023,899 A * | 2/2000 | Mecozzi | 52/396.04 |
| 6,293,069 B1 * | 9/2001 | Monda et al. | 52/460 |
| 6,314,701 B1 * | 11/2001 | Meyerson | 52/588.1 |
| 7,784,223 B1 * | 8/2010 | Ramey | 52/79.1 |
| 8,028,483 B2 * | 10/2011 | Carolan | 52/404.1 |
| 8,172,972 B2 * | 5/2012 | Carolan | 156/78 |
| 8,316,598 B2 * | 11/2012 | Flynn et al. | 52/235 |
| 8,316,603 B2 * | 11/2012 | Flynn et al. | 52/309.3 |
| 2001/0009085 A1 * | 7/2001 | Boyer | 52/236.9 |
| 2006/0096213 A1 * | 5/2006 | Griffin et al. | 52/409 |
| 2006/0174586 A1 * | 8/2006 | Morandi | 52/782.1 |
| 2009/0136703 A1 * | 5/2009 | Carolan et al. | 428/55 |
| 2009/0165412 A1 * | 7/2009 | Flynn et al. | 52/309.3 |
| 2009/0186541 A1 * | 7/2009 | Carolan et al. | 442/38 |
| 2009/0241443 A1 * | 10/2009 | Flynn et al. | 52/235 |
| 2010/0229484 A1 * | 9/2010 | Carolan et al. | 52/302.1 |
| 2010/0255256 A1 * | 10/2010 | Carolan et al. | 428/158 |
| 2011/0195218 A1 * | 8/2011 | Carolan et al. | 428/55 |
| 2011/0258944 A1 * | 10/2011 | Radoane | 52/62 |
| 2011/0297297 A1 * | 12/2011 | Carolan | 156/78 |
| 2012/0073224 A1 * | 3/2012 | Carolan | 52/309.4 |
| 2012/0186633 A1 * | 7/2012 | Carolan et al. | 136/251 |

* cited by examiner

COMPOSITE INSULATION PANEL

This is a national stage of PCT/IE12/000004 filed Feb. 9, 2012 and published in English, which has a priority of Irish no. 2011/0057 filed Feb. 9, 2011, hereby incorporated by reference.

INTRODUCTION

The invention relates to composite insulation panels of the type comprising inner and outer sheets with a body of insulation therebetween.

Insulation panels are widely known and used extensively, especially for wall and roof panels in buildings.

A building cladding is built up by interengaging a plurality of the panels and mounting the panels to an underlying support. There are several important steps which are required to be performed on site to fit the panels.

There is a need to simplify the steps that must be performed on site when installing such panels.

STATEMENTS OF INVENTION

According to the invention there is provided a manufactured composite insulating panel comprising:—
   an external sheet having an outer face and an inner face;
   an internal sheet having an outer face and an inner face;
   an insulating body between the inner face of the external sheet and the inner face of the internal sheet;
   the external sheet having a portion that extends beyond the internal sheet and the insulating body to define an overlap part for overlapping with part of an adjacent panel, on assembly; and
   a seal applied to the inner face of the overlap part of the external sheet.

In one embodiment the seal is adapted to fixedly bond to the inner face of the overlap part, on application, and to provide an outer exposed surface for releasably bonding to an adjacent panel on assembly on site.

The seal is advantageously of a material which is compatible with the insulating body.

The seal is advantageously a foam material, particularly a closed cell foam material.

In one case the seal is of a closed cell foam material which fixedly bonds to the inner face of the overlap part and which provides an outer exposed surface for releasably sealing with an adjacent panel, on assembly on site.

In one embodiment the overlap part comprises an end overlap part.

The seal may comprise a bead of sealant which extends across the inner face of the end overlap part.

The seal may comprise a plurality of beads of sealant which extend across the inner face of the end overlap part. At least some of the beads of sealant may be interconnected.

Alternatively or additionally the overlap part comprises a side overlap part. In this case the seal may comprise a bead of sealant which extends along the inner face of the side overlap part.

In one embodiment the external sheet comprises a plurality of longitudinally extending ribs.

In one case the insulating body comprises a foam such as a polyisocyanurate or phenolic foam material.

The external sheet may be of metallic material such as a steel material.

The internal sheet may be of a metallic material such as a steel material.

In one case the panel comprises a roof panel.

In one case the panel comprises a wall panel.

In one case the panel comprises a floor panel.

The invention also provides a roof assembly comprising a plurality of manufactured panels of the invention.

In another aspect the invention also provides a method for manufacturing a composite insulated panel comprising the steps of:—
   providing an insulation panel comprising an external sheet, an internal sheet and an insulating body between the external sheet and the internal sheet the external sheet having an overlap part; and
   applying a seal to the inner face of the overlap part of the external sheet.

In one case the overlap part comprises an end overlap part and the seal is applied across the end overlap part. The seal may comprise a plurality of beads of sealant which are applied across the end overlap part. The method may comprise interconnecting at least some of the beads of sealant.

Alternatively or additionally the overlap part comprises a side overlap part and the seal is applied along the side overlap part.

BRIEF DESCRIPTION OF THE DRAWINGS

The invention will be more clearly understood from the following description thereof given by way of example only, in which.

DETAILED DESCRIPTION

Figure 1:
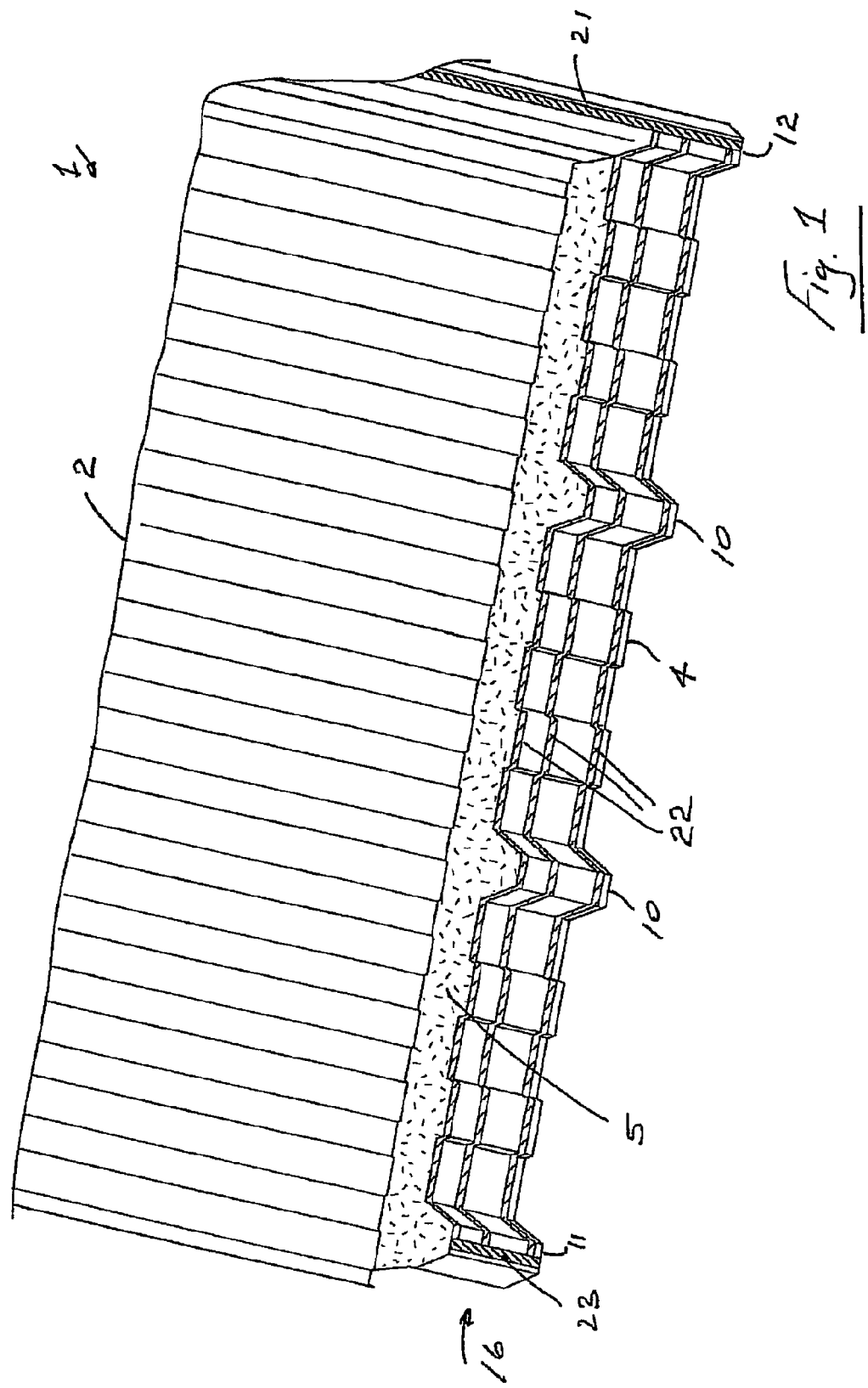
FIG. 1 is a perspective, partially cross sectional view of a manufactured insulating panel of the invention.
Figure 2:
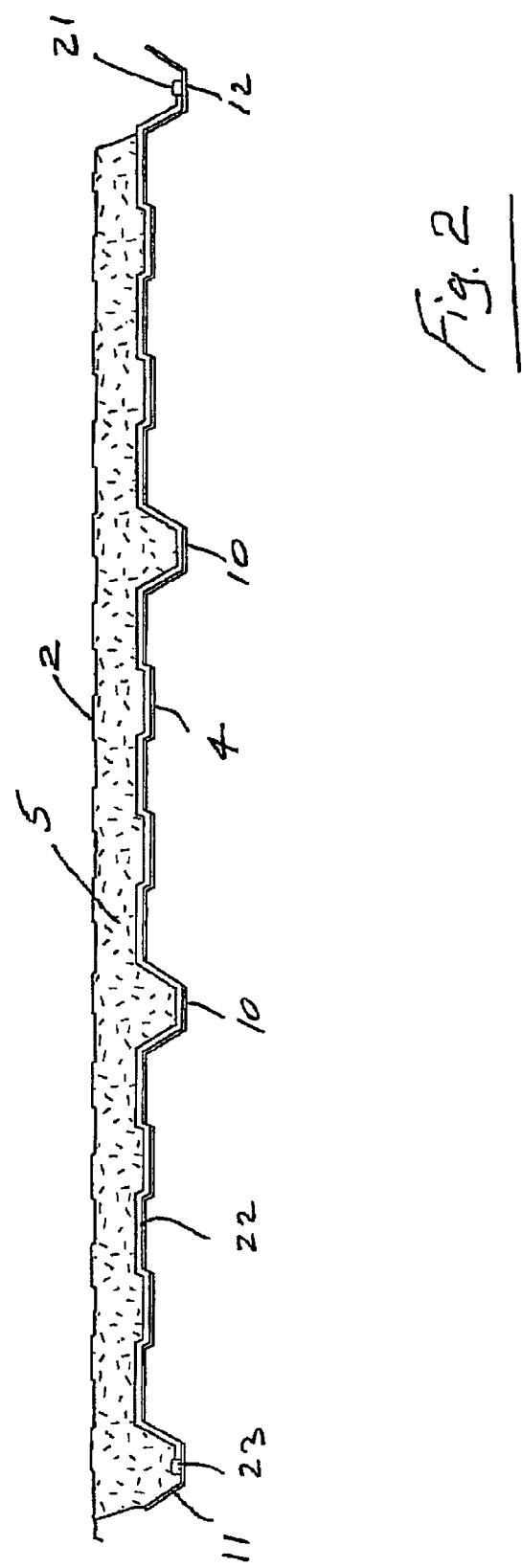
FIG. 2 is a cross sectional view of the panel of FIG. 1.

Referring to the drawings and initially to FIGS. 1 to 4 there is illustrated an insulating panel 1 according to the invention comprising a first or external sheet 4, a second or inner sheet 2 with an insulating body, in this case an insulating foam 5 therebetween. The external sheet 4 has inner and outer faces and the inner sheet 2 also has internal and external faces. The foam 5 extends between the inner face of the external sheet 4 and the inner face of the internal or liner sheet 2. The foam 5 may, for example be a polyisocyanurate foam or a phenolic foam. In this case the panel 1 is a roof panel 1 comprising a profiled external sheet 4 which is typically of metal, such as galvanised steel. The inner metal liner sheet 2 may be of painted galvanised steel.

The external sheet 4 is profiled and in this case the profile comprises a plurality of projections, in this case comprising elongate crowns 10 which extend longitudinally along the length of the external sheet 4. The crowns 10 in this case are of generally trapezoidal form. The external and/or internal sheets may have a plurality of elongate strengthening ribs which extend longitudinally along the length of the external sheet 2.

Figure 3:
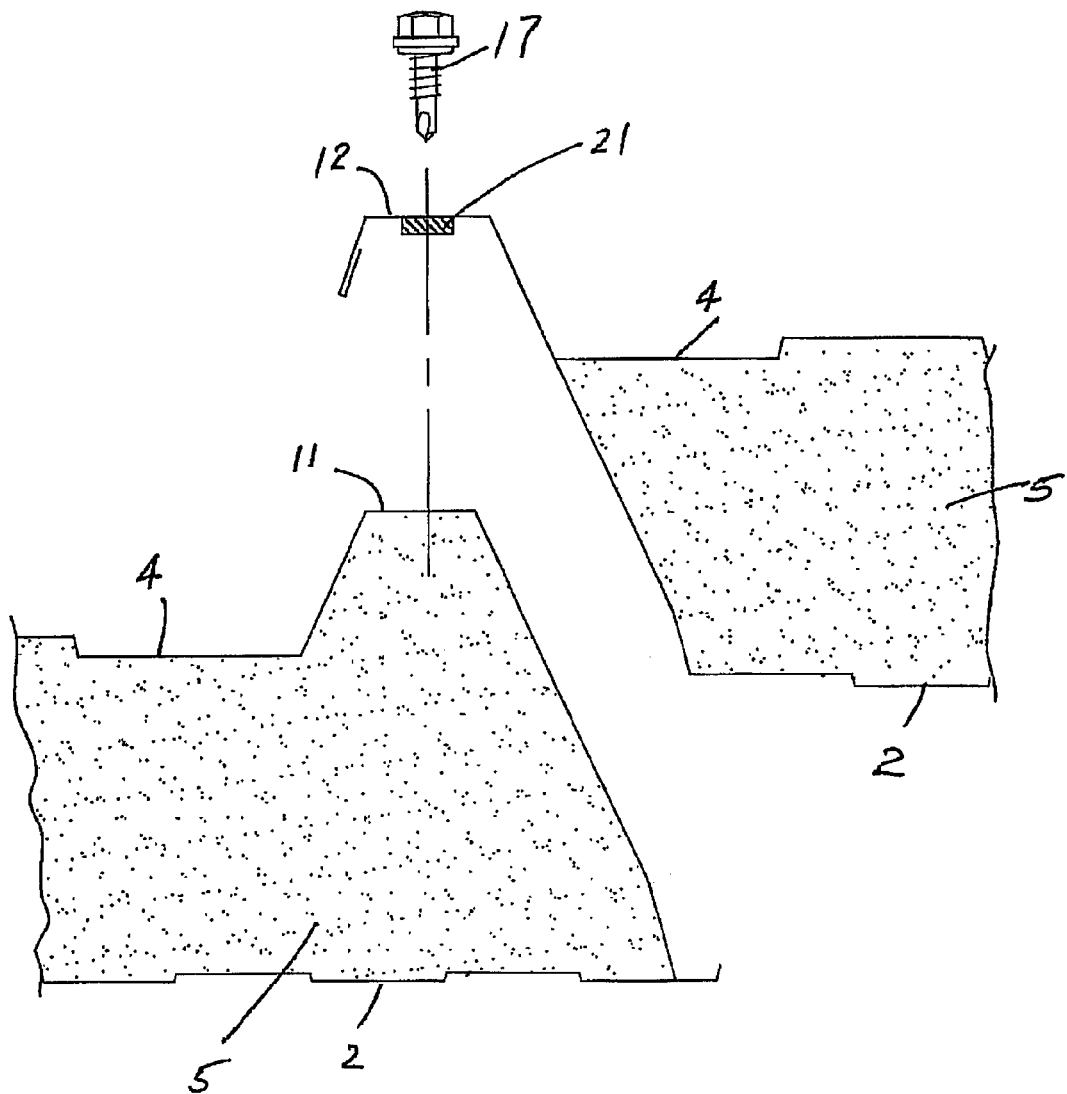
FIG. 3 is a cross sectional view showing a side overlap between adjacent like panels.

The external sheet 4 has overlap parts for overlapping with parts of adjacent panels, on assembly. In this case there are both end overlap features and side overlap features. The side overlap features in this case comprise a side underlap crown 11 on one side of the external sheet 4 and a side overlap crown 12 on the opposite side of the panel. In use, like panels are overlapped by overlapping the overlap crown 12 of one panel with the underlap crown 11 of an adjacent panel as illustrated in FIG. 3. Stitching screws 17 are used to secure the overlapped panels together on-site.

Figure 4:
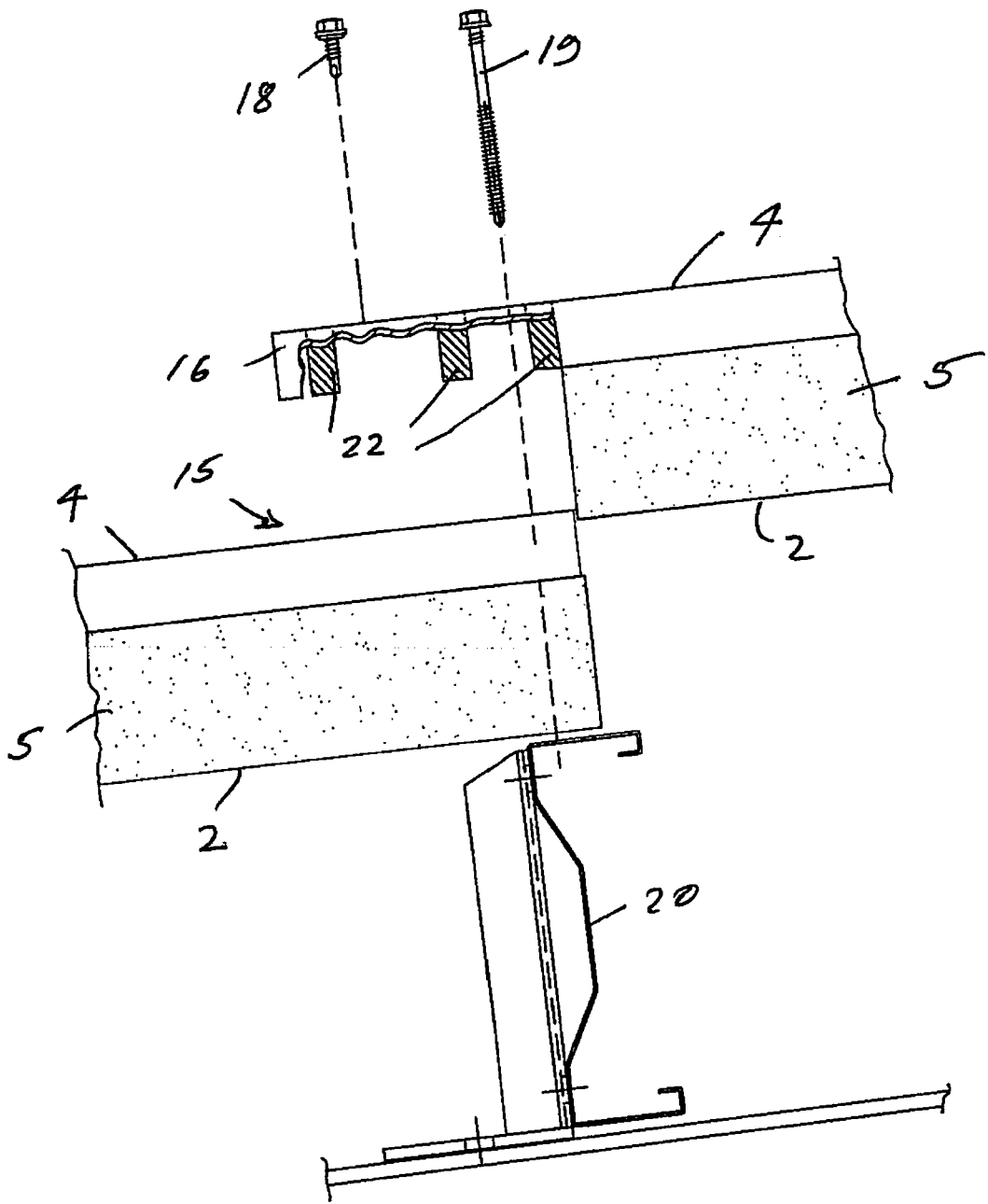
FIG. 4 is a cross sectional partially cut-away view showing an end overlap between adjacent like panels.

The end overlap features also comprise an end underlap portion 15 and an end overlap portion 16 for end lapping of adjacent like panels. The external sheet 4 has portions that extend beyond the internal sheet 2 and the foam core 5 to define the side overlap part 12 and the end overlap part 16 for overlapping with corresponding underlap parts 11, 15 of adjacent panels, on assembly. The end overlap is illustrated in FIG. 4. Stitching screws 18 are used to secure the overlapped panels together on-site. Main panel fixing screws 19 are used to fasten the overlapped panels to an underlying support which in this case comprises a purlin 20.

A side seal comprising a bead 21 of a sealant material is factory applied to the inner face of the side underlap part 12 of the external sheet 4 along the length of the sheet 4. This greatly simplifies the installation process as a site worker does not have to apply a seal from an applicator as the panels are being laid to form a roof. The new system also improves site safety as there is less work to be carried out at roof level. Further, as the seal is applied in the factory it is assured that the correct seal is in place at the correct location on the panel to further assure weather tightness at the side joint between adjacent overlapped panels.

Advantageously, the seal is of a material which is adapted to fixedly bond to the inner face of the overlap part, on application. The outer exposed surface of the seal is tacky for releasably bonding to an adjacent panel on assembly on site. This is achieved without requiring any temporary cover such as a peel-off paper over the exposed face of the seal. This eliminates waste paper which is often discarded in an unsightly manner.

Importantly, the seal does not cause the panels to become permanently fixed to one another. The seal allows the disassembly of the panels at any time. This facilitates building end of life disassembly for material recycling.

Advantageously, the seal is of a foam material which is compatible with the insulation foam of the panel. As similar materials are used in the seal and in the foam the seal can be readily utilised in a factory without any additional handling/safety issues. The seal may be formed from a polyol component and an isocyanate component with additives to maintain the foam in a bead-like shape. The polyol may be Dow Hyperlast (Trademark) 2851264. The isocyanurate may be Dow Hyperlast LE 5000. The additive may be Jeffamine (Trademark) D230.

In one case the seal is of a butyl rubber. However, one problem with such a material is that panels become permanently fixed together at the joint therebetween (similar to welding) and presents major problems if the panels need to be disassembled, for example, for material recycling at building end life.

An end seal comprising a plurality of beads 22 of a sealant material are factory applied to the inner face of the side underlap part 12 of the external sheet 4 across substantially the width of the panel. This greatly simplifies the installation process as a site worker does not have to apply end seals from an applicator as the panels are being laid to form a roof. The new system improves site safety as there is less work to be carried out at roof level. Further, as the end seals are applied in the factory it is assured that the correct seals are in place at the correct location on the panel to further assure weather tightness at the end joint between adjacent overlapped panels. In this case the beads 23 of sealant are interconnected by longitudinally extending portions 25 of sealant. This feature provides for enhanced sealing and facilitates efficient application of the seals in the factory.

Composite panels may be manufactured by a continuous process as described in our GB2309412 A and GB2402101 A, the entire contents of which are herein incorporated by reference.

The panels are manufactured with the outer face of the external sheet 2 lowermost. Liquid foam reactants are laid down onto the inner face of the external sheet 4 and the inner liner sheet 2 is positioned over the foam. The sandwich thus formed is then led through an oven in which the foam expands.

Figure 5:
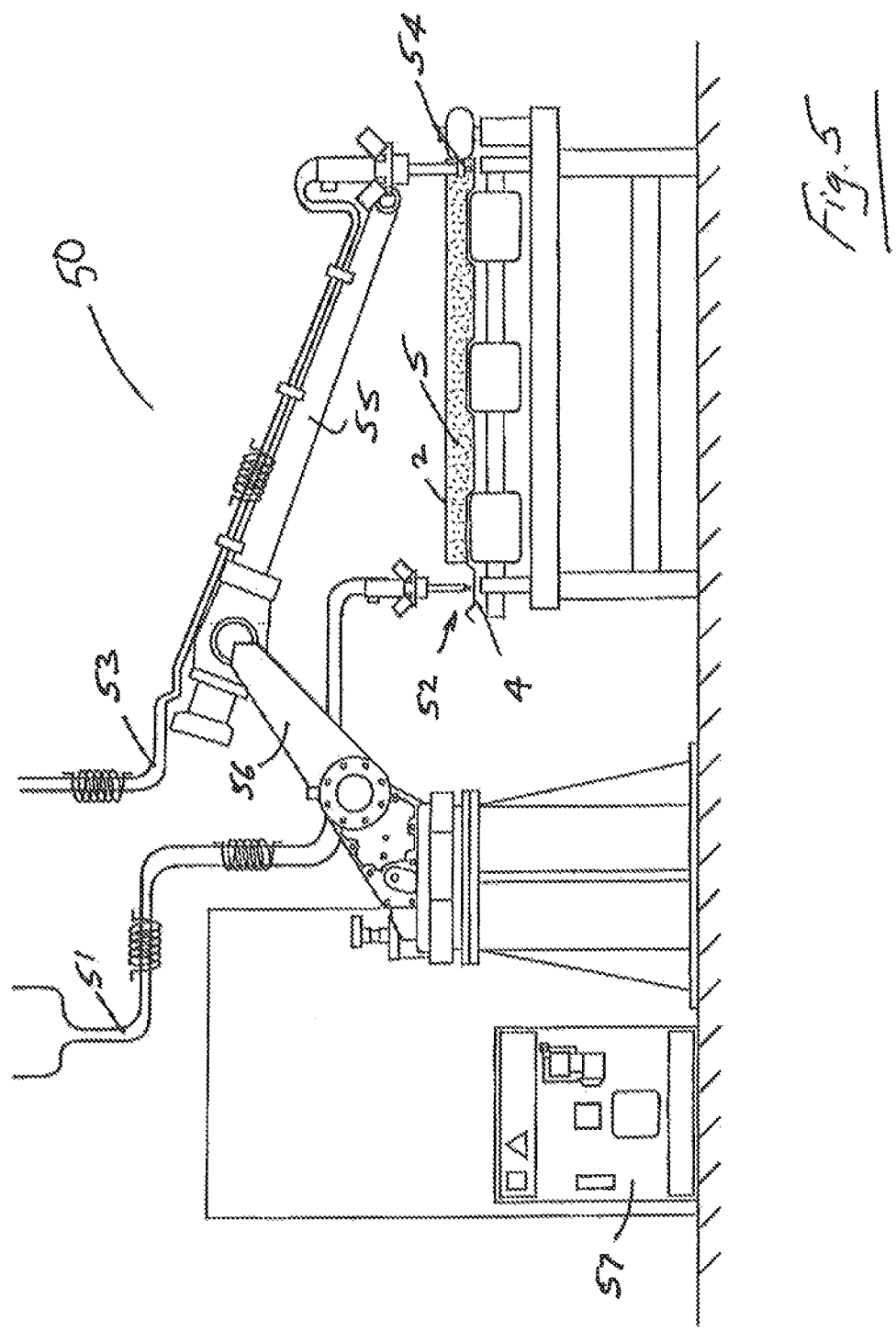
FIG. 5 is a schematic of a part of a manufacturing installation used to manufacture the panels.

Referring to FIG. 5 there is illustrated a manufacturing station 50 at which the side and end sealants 21, 22 are applied. The side sealant is supplied in liquid form along supply lines 51 (which may be heated) to a side seal applicator head 52. The end sealant is supplied in liquid form along supply lines 53 (which may be heated) to movable end seal applicator head 54. The applicator head 54 is mounted to a robotic arm 55 which is moved by further robotic arms 56 30 under the control of a controller 57. The applicator head 54 is moved over and back across the end overlap portion 16 of the external sheet to apply the beads of sealant 22 as the panel moves through the applicator station.

The panels may be used to construct part of or all of a building envelope including part or all of one or more of the roof, walls and floor.

Modifications and additions can be made to the embodiments of the invention described herein without departing from the scope of the invention. For example, while the embodiments described herein refer to particular features, the invention includes embodiments having different combinations of features. The invention also includes embodiments that do not include all of the specific features described.

Many variations on the embodiments described will be readily apparent. Accordingly the invention is not limited to the embodiments hereinbefore described which may be varied in detail.

The invention claimed is:

1. A manufactured composite insulating panel comprising:—
    an external sheet having an outer face and an inner face;
    an internal sheet having an outer face and an inner face;
    an insulating body between the inner face of the external sheet and the inner face of the internal sheet,
    the external sheet having a portion that extends beyond the internal sheet and the insulating body to define an overlap part for overlapping with part of an adjacent panel, so that on assembly the overlap part of said manufactured composite insulating panel, overlaps with the adjacent panel; and
    a seal applied to the inner face of the overlap part of the external sheet,
    wherein the seal is fixedly bonded to the inner face of said overlap part, and said fixedly bonded seal provides an outer exposed surface for releasably sealing said overlap part to an adjacent panel with which, on assembly, the overlap part overlaps, whereby the seal does not cause the panels to become permanently fixed to one another.

2. The manufactured panel as claimed in claim 1 wherein the seal is of a material which is compatible with the insulating body.

3. The manufactured panel as claimed in claim 1 wherein the seal is a foam material.

4. The manufactured panel as claimed in claim 3 wherein the seal is a closed cell foam material.

5. The manufactured panel as claimed in claim 1 wherein the overlap part comprises an end overlap part.

6. The manufactured panel as claimed in claim 5 wherein the seal comprises a bead which extends across the inner face of the end overlap part.

7. The manufactured panel as claimed in claim 6 wherein the seal comprises a plurality of beads of sealant, said plurality of beads extending which extends across the inner face of the end overlap part.

8. The manufactured panel as claimed in claim 1 wherein the overlap part comprises a side overlap part.

9. The manufactured panel as claimed in claim 8 wherein the seal comprises a bead which extends along the inner face of the side overlap part.

10. The manufactured panel as claimed in claim 1 wherein the external sheet comprises a plurality of longitudinally extending ribs.

11. The manufactured panel as claimed in claim 1 wherein the insulating body comprises a foam.

12. The manufactured panel as claimed in claim 11 wherein the foam comprises a polyisocyanurate foam material.

13. The manufactured panel as claimed in claim 11 wherein the foam comprises a phenolic foam material.

14. The manufactured panel as claimed in claim 1 wherein the external sheet comprises a metallic material.

15. The manufactured panel as claimed in claim 1 wherein the external sheet comprises a steel material.

16. The manufactured panel as claimed in claim 1 wherein the internal sheet comprises a metallic material.

17. The manufactured panel as claimed in claim 1 wherein the internal sheet comprises a steel material.

18. The manufactured panel as claimed in claim 1 wherein the panel comprises a roof panel.

19. The manufactured panel as claimed in claim 1 wherein the panel comprises a wall panel.

20. The manufactured panel as claimed in claim 1 wherein the panel comprises a floor panel.

21. A roof assembly comprising a plurality of manufactured composite insulating panels as claimed in claim 1.

\* \* \* \* \*

UNITED STATES PATENT AND TRADEMARK OFFICE
CERTIFICATE OF CORRECTION

PATENT NO.         : 9,145,680 B2                                                Page 1 of 1
APPLICATION NO.    : 13/984301
DATED              : September 29, 2015
INVENTOR(S)        : James Carolan et al.

It is certified that error appears in the above-identified patent and that said Letters Patent is hereby corrected as shown below:

In the specification

Column 4
Line 20                "robotic arms 56 30" should be --robotic arms 56--.

In the claims

Column 5
Line 8, claim 7        After "extending", delete "which extends".

Signed and Sealed this
Fifth Day of April, 2016

Michelle K. Lee
*Director of the United States Patent and Trademark Office*